No. 836,635. PATENTED NOV. 20, 1906.
J. A. COX.
COFFEE POT.
APPLICATION FILED APR. 21, 1906.
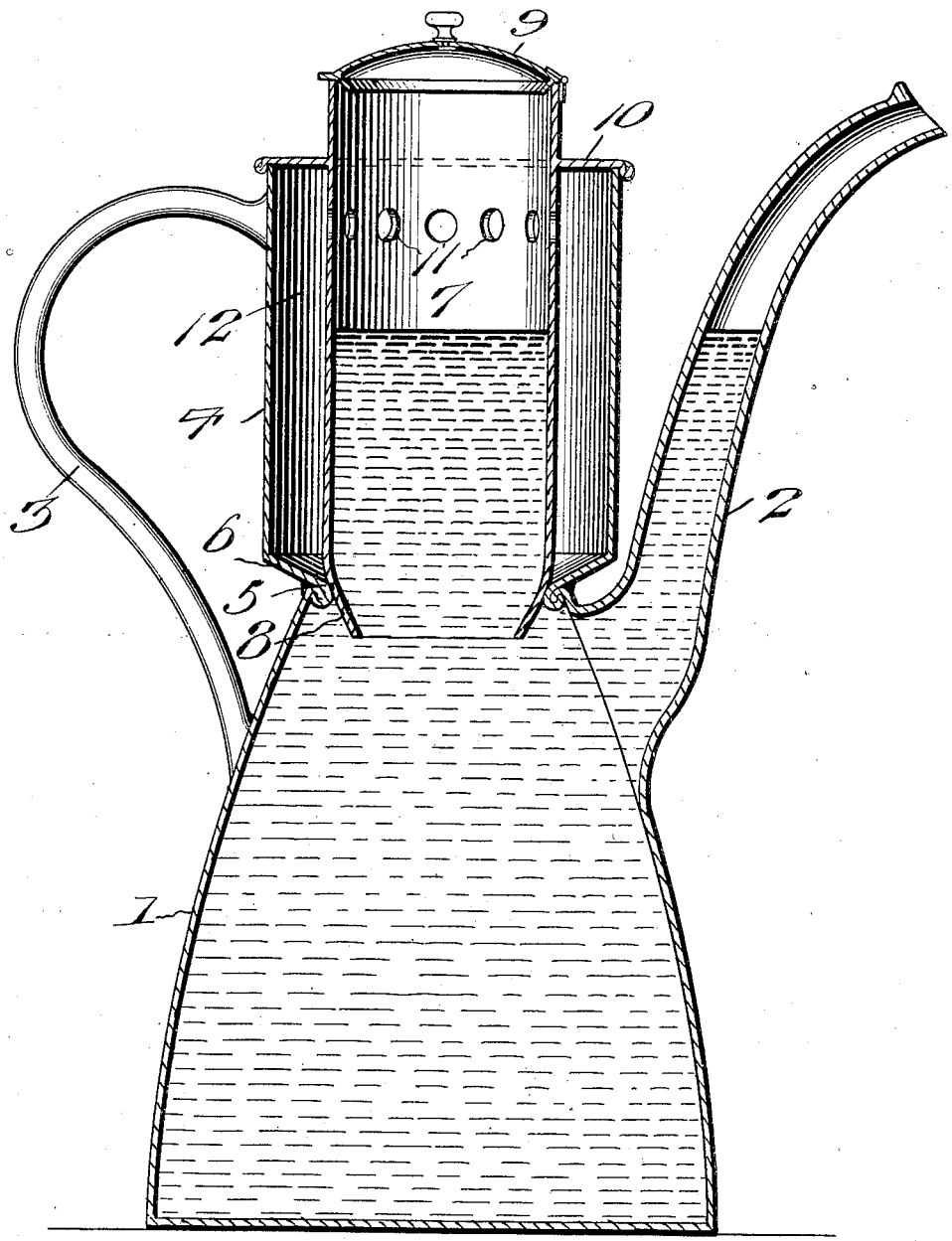
Witnesses
Inventor
J. A. Cox,
By Victor J. Evans,
Attorney

UNITED STATES PATENT OFFICE.

JOSEPH A. COX, OF TALMAGE, CALIFORNIA.

COFFEE-POT.

No. 836,635.  Specification of Letters Patent.  Patented Nov. 20, 1906.

Application filed April 21, 1906. Serial No. 313,099.

*To all whom it may concern:*

Be it known that I, JOSEPH A. COX, a citizen of the United States, residing at Talmage, in the county of Mendocino and State of California, have invented new and useful Improvements in Coffee-Pots, of which the following is a specification.

This invention relates to coffee-pots, and has for its objects to produce a comparatively simple inexpensive device of this character which will effectually prevent the contents of the pot from boiling over, one in which the contents may be conveniently introduced, and one whereby the coffee will be subjected to an efficient settling action during the boiling operation.

With these and other objects in view the invention comprises the novel features of construction and combination of parts more fully hereinafter described.

In the accompanying drawings the figure is a vertical longitudinal section taken centrally through a coffe-pot embodying the invention.

Referring to the drawings, 1 designates the pot or vessel, having a spout 2 and a handle 3 and provided with an upper cylindrical portion or section 4, joined to the upper end of the pot, preferably in the manner shown, to produce a reduced opening or passage 5 of communication between the vessel and section, the section 4 having a lower end wall or bottom 6 inclined downwardly toward the opening 5 and having an initially open upper end.

Disposed in the upper section 4 is a cylindrical tubular member 7, having a tapered reduced lower end 8, adapted to fit tightly in the opening 5 and projected downward a slight distance into the pot 1 said member, which has at its upper end a pivoted hinged lid or cover 9, being provided at a point adjacent its outer end with an outstanding marginal flange 10, adapted to sit upon the upper end of and form a closure for the section 4, and at a point below said flange with a marginal series of openings 11, adapted when the member is in place to communicate with the space or chamber 12 between the walls of the member and section 4.

In practice the pot having the member 7 positioned therein is, by raising the lid 9, filled in the usual manner until the liquid reaches the level approximately as shown herein. The vessel is then placed over a fire and its contents boiled in the usual manner for drawing the coffe, it being evident that during the boiling process if the liquid rises in the member 7 it will flow through the openings 11 into the chamber 12, being thus prevented from boiling over onto the stove, and, further, that the particles of coffee which usually rise on the liquid will pass into the chamber by which they will be retained and prevented from flowing with the liquid through the spout 2 while pouring the coffee. After the vessel has been removed from the stove the coffee which has accumulated in the chamber 12 may by lifting the member 7 be permitted to flow through the opening 5 into the body of the vessel, the return of the liquid to the vessel being facilitated by the inclined bottom 6.

Having thus described my invention, what I claim is—

1. A vessel of the type described having an upper section communicating therewith through a reduced opening, and a tubular member arranged in said section and having a reduced lower end seated in said opening, said member being provided with a flange adapted to close the upper end of the section and with openings communicating with the chamber formed between the member and section.

2. A vessel of the type described having an upper tubular section communicating therewith through a reduced opening, said section being provided with a downwardly-inclined bottom leading to said opening, and a tubular member disposed in the section and having its lower end fitted in said opening, said member and section conjointly forming a chamber and the member having openings communicating with the latter and being provided with a marginal flange forming a closure for the upper end of the chamber.

In testimony whereof I affix my signature in presence of two witnesses.

JOSEPH A. COX.

Witnesses:
F. C. HANDY,
F. E. ALLEN.